United States Patent
Frivik et al.

(10) Patent No.: US 9,207,347 B2
(45) Date of Patent: Dec. 8, 2015

(54) DETERMINING THE STRUCTURE OF A TOWED SEISMIC SPREAD ELEMENT

(75) Inventors: Svein Arne Frivik, Oslo (NO); Halvor Groenaas, Oslo (NO); Kenneth E. Welker, Nesoya (NO)

(73) Assignee: WesternGeco L.L.C., Houston, TX (US)

( * ) Notice: Subject to any disclaimer, the term of this patent is extended or adjusted under 35 U.S.C. 154(b) by 1091 days.

(21) Appl. No.: 12/168,121

(22) Filed: Jul. 5, 2008

(65) Prior Publication Data
US 2010/0002538 A1  Jan. 7, 2010

(51) Int. Cl.
*G01V 1/38* (2006.01)

(52) U.S. Cl.
CPC ..................... *G01V 1/3826* (2013.01)

(58) Field of Classification Search
CPC .................................................... G01V 1/3826
USPC ...................................................... 367/15–19
See application file for complete search history.

(56) References Cited

U.S. PATENT DOCUMENTS

| | | |
|---|---|---|
| 2,407,680 A | 9/1946 | Palmquist |
| 3,190,178 A | 6/1965 | Mckenzie |
| 3,417,959 A | 12/1968 | Schultz |
| 3,585,415 A | 6/1971 | Muller et al. |
| 3,922,065 A | 11/1975 | Schultz |
| 3,935,365 A | 1/1976 | Eigenmann |
| 4,075,049 A | 2/1978 | Wood |
| 4,182,548 A | 1/1980 | Searight et al. |
| 4,332,437 A | 6/1982 | Searight et al. |
| 4,367,857 A | 1/1983 | McCarthy |
| 4,511,210 A | 4/1985 | Tung et al. |
| 4,569,920 A | 2/1986 | Smith-Johannsen |
| 4,626,127 A | 12/1986 | May |
| 4,719,987 A | 1/1988 | George, Jr. et al. |
| 4,797,677 A * | 1/1989 | MacDoran et al. ........... 342/352 |
| 4,896,943 A | 1/1990 | Tolliver et al. |
| 4,897,136 A | 1/1990 | Bailey et al. |
| 4,912,682 A * | 3/1990 | Norton et al. ................... 367/19 |
| 4,992,990 A * | 2/1991 | Langeland et al. ............. 367/19 |
| 5,064,272 A | 11/1991 | Bailey et al. |
| 5,066,098 A | 11/1991 | Kult et al. |
| 5,117,400 A | 5/1992 | Penn et al. |
| 5,146,287 A | 9/1992 | Carder |
| 5,270,780 A | 12/1993 | Moran et al. |
| 5,532,975 A * | 7/1996 | Elholm .......................... 367/16 |
| 5,668,775 A | 9/1997 | Hatteland |
| 5,913,280 A | 6/1999 | Nielsen et al. |

(Continued)

FOREIGN PATENT DOCUMENTS

| | | |
|---|---|---|
| GB | 2414804 A | 12/2005 |
| WO | WO 2005096018 A1 * | 10/2005 |

OTHER PUBLICATIONS

Loweth, "Maunal of offshore surveying form geoscientists and engineers", Chapman & Hall, 1997.*

(Continued)

*Primary Examiner* — Krystine Breier (57) ABSTRACT

A technique includes obtaining a plurality of sets of measurements of distances between nodes located on a seismic spread element while the element is in tow. Each set is acquired in response to the operation of a different set of sources. The technique includes determining a three-dimensional structure of the seismic spread element while in tow based at least in part on the sets of measurements.

14 Claims, 10 Drawing Sheets

(56) References Cited

U.S. PATENT DOCUMENTS

| | | | |
|---|---|---|---|
| 6,097,424 A | 8/2000 | Zernov et al. | |
| 6,115,511 A | 9/2000 | Sakai et al. | |
| 6,252,222 B1 | 6/2001 | Kasapi et al. | |
| 6,256,090 B1 | 7/2001 | Chen et al. | |
| 6,366,533 B1 | 4/2002 | English | |
| 6,420,976 B1 | 7/2002 | Baggs et al. | |
| 6,476,853 B1 | 11/2002 | Zernov et al. | |
| 6,512,887 B2 | 1/2003 | Inoue et al. | |
| 6,552,965 B2 | 4/2003 | Brandt et al. | |
| 6,707,761 B2 | 3/2004 | Erikson | |
| 6,946,618 B2 | 9/2005 | Tamura et al. | |
| 6,970,578 B1 | 11/2005 | Strand | |
| 6,987,527 B2 | 1/2006 | Kossin | |
| 7,376,045 B2 * | 5/2008 | Falkenberg et al. | 367/19 |
| 7,539,079 B2 * | 5/2009 | Hoogeveen et al. | 367/19 |
| 2004/0070770 A1 | 4/2004 | Desharnais et al. | |
| 2007/0064526 A1 * | 3/2007 | Holo | 367/15 |
| 2007/0223307 A1 | 9/2007 | Howlid et al. | |
| 2008/0008037 A1 | 1/2008 | Welker | |
| 2009/0245019 A1 * | 10/2009 | Falkenberg et al. | 367/17 |

OTHER PUBLICATIONS

Loweth "Manual of offshore surveying for geoscientists and engineers", Chapman & Hall, 1997.*

Loweth, "Manual of offshore surveying for geoscientists and engineers", Chapman & Hall, 1997.*

A. Ziolkowski et al., "The signature of an air gun array: computation from near-field measurements including interactions", Geophysics 47(10):1413-1421 (1982).

Leica Geosystems, http://gis.leica-geosystems.com/LGISub1x3x0.aspx, copyright 2006.

Trimble GX, http://www.trimble.com/trimblegx.shtm, copyright 2009.

International Search Report for PCT/US2009/049193, dated Jan. 29, 2010.

* cited by examiner

DETERMINING THE STRUCTURE OF A TOWED SEISMIC SPREAD ELEMENT

BACKGROUND

The invention generally relates to determining the structure of a towed seismic spread element.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes obtaining a plurality of sets of measurements of distances between nodes located on a seismic spread element while the element is in tow. Each set is acquired in response to the operation of a different set of sources. The technique includes determining a three-dimensional structure of the seismic spread element while in tow based at least in part on the sets of measurements.

In another embodiment of the invention, a system includes an interface and a processor. The interface receives a plurality of sets of measurements of distances between nodes located on a seismic spread element while in tow. Each set is acquired in response to the operation of a different set of sources. The processor determines a three-dimensional structure of the seismic spread element while in tow based at least in part on the sets of measurements.

In yet another embodiment of the invention, an article includes a computer accessible storage medium that contains instructions that when executed by a processor-based system cause the processor-based system to receive a plurality of sets of measurements of distances between nodes located on a seismic spread element while in tow. Each set is acquired in response to the operation of a different set of sources. The instructions when executed cause the processor-based system to determine a three-dimensional structure of the seismic spread element while in tow based at least in part on the sets of measurements.

Advantages and other features of the invention will become apparent from the following drawing, description and claims.

DETAILED DESCRIPTION

Figure 1:
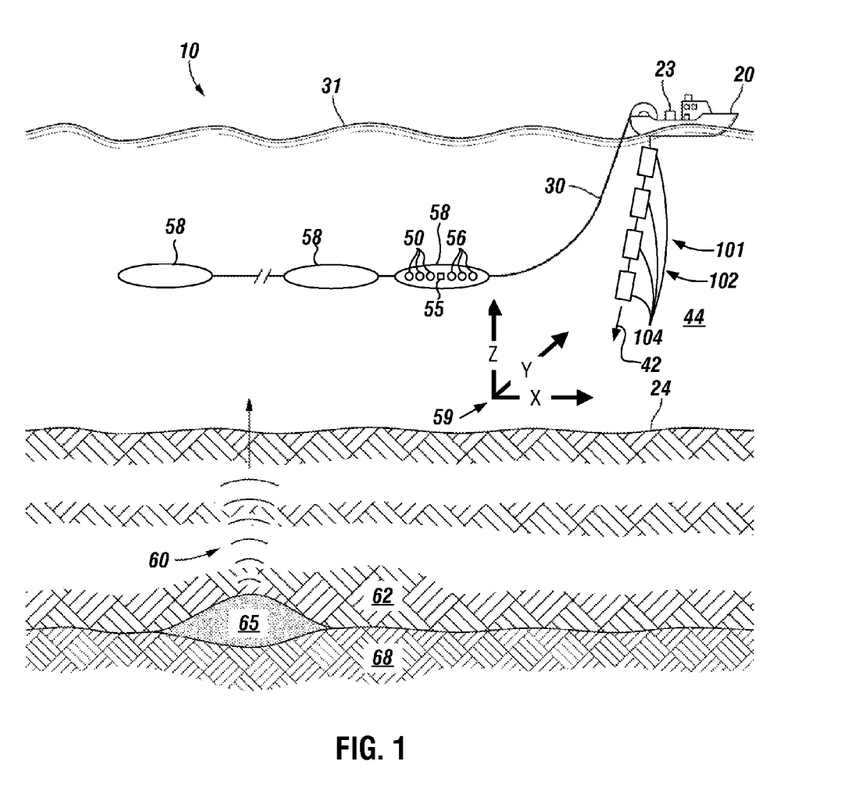
FIG. 1 is a schematic diagram of a marine seismic acquisition system according to an embodiment of the invention.

FIG. 1 depicts an embodiment 10 of a marine seismic data acquisition system in accordance with some embodiments of the invention. In the system 10, a survey vessel 20 tows one or more seismic streamers 30 (one streamer 30 being depicted in FIG. 1) behind the vessel 20. The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals.

In accordance with embodiments of the invention, the seismic sensors are multi-component seismic sensors 58, each of which is capable of detecting a pressure wavefield and at least one component of a particle motion that is associated with acoustic signals that are proximate to the multi-component seismic sensor 58. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor 58 may include one or more hydrophones, geophones, particle displacement sensors, particle velocity sensors, accelerometers, pressure gradient sensors, or combinations thereof.

For example, in accordance with some embodiments of the invention, a particular multi-component seismic sensor 58 may include a hydrophone 55 for measuring pressure and three orthogonally-aligned accelerometers 50 to measure three corresponding orthogonal components of particle velocity and/or acceleration near the seismic sensor 58. It is noted that the multi-component seismic sensor 58 may be implemented as a single device (as depicted in FIG. 1) or may be implemented as a plurality of devices, depending on the particular embodiment of the invention. A particular multi-component seismic sensor 58 may also include pressure gradient sensors 56, which constitute another type of particle motion sensors. Each pressure gradient sensor measures the change in the pressure wavefield at a particular point with respect to a particular direction. For example, one of the pressure gradient sensors 56 may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

Figure 2:
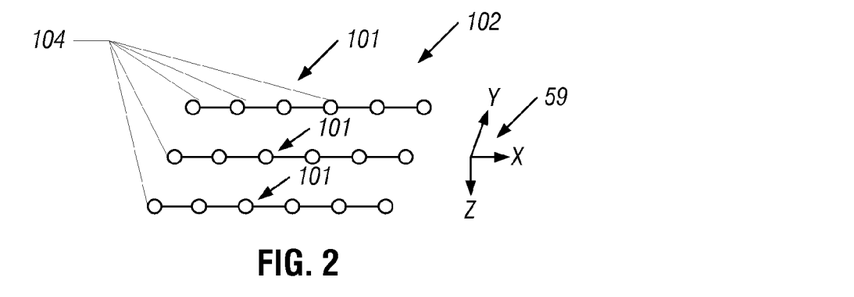
FIG. 2 is an illustration of a seismic source array according to an embodiment of the invention.

The marine seismic data acquisition system 10 includes a seismic source that may be formed from one or more seismic source arrays 102 (one partial source array 102 being depicted in FIG. 1). Each source array 102, in turn, includes multiple strings 101 (one string 101 being depicted in FIG. 1) of seismic source elements 104 (air guns, for example). Referring also to FIG. 2, as an example, the array 102 may be a 3-x-6 array of seismic source elements 104, although in other examples, arrays of other sizes may be used. Additionally, although FIG. 2 generally depicts a rectangular array, the array 102 may be arranged in one or a number of different geometries, depending on the particular embodiment of the invention. In some embodiments of the invention, the seismic source elements 104 may be coupled to, or towed by, the survey vessel 20, as depicted in FIG. 1. Alternatively, in other embodiments of the invention, the seismic source elements 104 may operate independently of the survey vessel 20, in that the elements 104 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the array 102 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 produce corresponding reflected acoustic signals, or pressure waves 60, which are sensed by the multi-component seismic sensors 58. It is noted that the pressure waves that are received and sensed by the multi-component seismic sensors 58 include "up going" pressure waves that propagate to the sensors 58 without reflection, as well as "down going" pressure waves that are produced by reflections of the pressure waves 60 from an air-water boundary 31.

The multi-component seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular multi-component seismic sensor 58 may provide a trace, which corresponds to a measure of a pressure wavefield by its hydrophone 55; and the sensor 58 may provide one or more traces that correspond to one or more components of particle motion, which are measured by its accelerometers 50.

Figure 11:
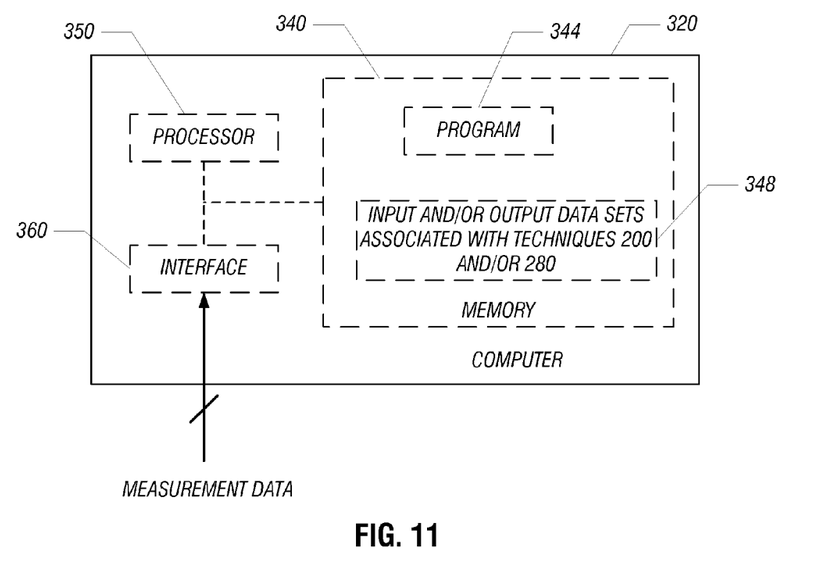
FIG. 11 is a schematic diagram of a processing system according to an embodiment of the invention.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as an exemplary seismic data processing system 320 that is depicted in FIG. 11 and is further described below) that may be, for example, located on land or on the vessel 20. Thus, many variations are possible and are within the scope of the appended claims.

The seismic source elements 104 may be interconnected by non-rigid connecting structures, such as chains, ropes, cables, etc. Due to the non-rigid arrangement of these interconnections, the array(s) 102 is subject to varying geometric shapes due to the sea environment, including sea surface waves, currents, etc. Additionally, the instability of the geometric shape of the array(s) 102 may be due to sudden changes in vessel steering or due to source steering (for example, which steerable source array that pulls the source array to the side at the front of the array, which may introduce a mismatch between the front and back of the array for a short period of time).

The seismic source is one example of a "seismic spread element" in accordance with embodiments of the invention. Techniques are described herein for purposes of determining the three-dimensional structure of the spread element. It is noted that although a seismic source is specifically described herein as an exemplary "seismic spread element," by way of example herein it is understood that the three-dimensional structure of other seismic spread elements may be determined in a similar manner in accordance with other embodiments of the invention. As just a few examples, a spread element may be a seismic source, a set of streamers 30, as a set of tailbouys, etc., or a combination of any of these. Regardless of the particular seismic spread element whose three-dimensional structure is being determined, the structure may change due to the above-mentioned effects during the towing of the element.

In order to properly process the seismic data acquired by the seismic sensors, the three-dimensional structure of the seismic source is determined. It is noted that in marine seismic surveys, one of the client deliverables typically is the marine source position, often called the center of source (CoS). A second deliverable may be separation between the strings or source arrays that form the seismic source.

Global positioning satellite (GPS) receivers may be located on floats that are coupled to the strings 101 for purposes of determining the position of the floats on the sea surface. Given the nominal geometry of the source, the GPS positions and the depth measurements, the center of source and string separations may be estimated.

Some conventional systems may use in, addition to the above-described GPS receivers, acoustic locator sources, called pingers, and receivers to obtain acoustic ranges for tail array separation. Measurements that are acquired via the pinger and receiver arrangement may be incorporated when determining the position of the marine source. The objective with the use of the pinger and receiver arrangement is to determine the distance between gun strings at the gun level, as the GPS receivers only measure the separation on the sea surface level.

The above-described arrangement of the acoustic, GPS receiver and depth sensor measurements may be combined into a "quasi three-dimensional (3-D)" solution of the marine source positions. Techniques and systems are described herein for purposes of determining full 3-D source positions of the seismic source elements 104, based on repeated distance measurements that are made in 3-D space.

More specifically, techniques and systems are described herein for determining the positions of certain points, or nodes, of the seismic source. In general, each node is associated with a particular receiver, such as a hydrophone at a particular seismic source element 104, or a locator source. In other words, in accordance with embodiments of the invention, each node is either co-located with a particular seismic source element 104 or locator source, or has a fixed or determinable position with respect to the location of a particular seismic source element 104 or locator source. As described herein, the distances between the nodes are repeatedly measured by different measurement systems to derive an overdetermined system that is inverted for purposes of determining the positions of the nodes.

Thus, as a general example, a first locator source, which is associated with one node, may transmit a signal (an optical or acoustical signal, for example) that is received by a certain group of receivers, which are associated with multiple nodes. The receivers collectively acquire measurements of the transmitted signal, and these measurements indicate the distances between the nodes. Another locator source, which may be associated with the same node as the first locator source, may transmit a signal that is also received by the receivers to form a second set of measurements of the distances. The positions of the nodes may then be determined based on both sets of measurements.

Figure 3:
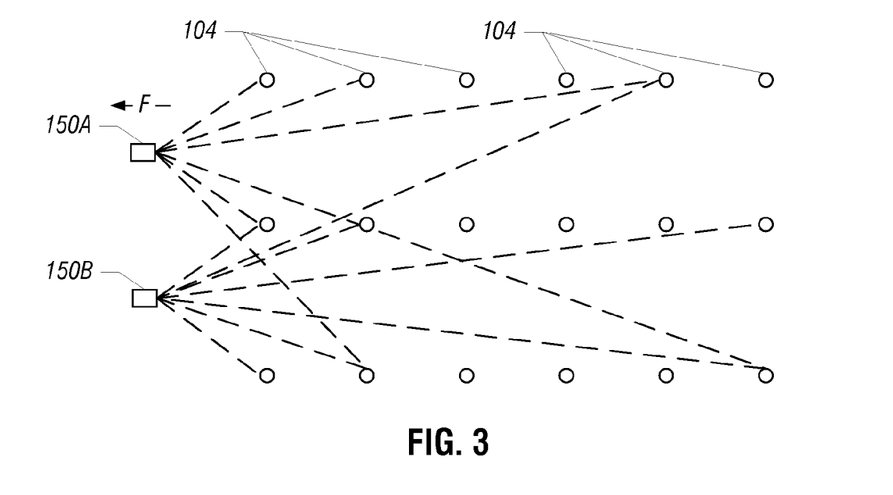
FIGS. 3 and 4 illustrate optical systems to determine relative distances between nodes according to an embodiment of the invention.

The locator sources and receivers may take on numerous forms, depending on the particular embodiment of the invention. As an example, FIG. 3 depicts an arrangement in which optical devices 150A and 150B each direct focused beams of light (indicated by dashed lines) onto the seismic source elements 104. The light beams are reflected by reflectors on the seismic source elements 104 and are detected by light detectors in the optical devices 150A and 150B. Based on the emitted and reflected light, inline distances (i.e., inline with respect to the direction and movement of the seismic sources towed by the vessel 20) may be determined. Also, cross-line distances (i.e., crossline or perpendicular to the direction of movement) between the nodes may also be determined. Thus, using the optical devices 150A and 150B, a first set of measurements of the distances between the source and receiver nodes may be acquired.

Although not depicted in FIG. 3, another optical device may be provided such that three light sources are employed, which allows for determination of the elevation (i.e., depth) of each seismic source element 104. Alternatively, instead of using a third light source, depth sensors may be used to determine the elevation of each seismic source element 104. More details regarding optical systems, such as the one depicted in FIG. 3, for purposes of measuring the distances between nodes is described in co-pending U.S. patent application Ser. No. 11/456,059, entitled "OPTICAL METHODS AND SYSTEMS IN MARINE SEISMIC SURVEYING," which was filed on Jul. 6, 2006, and is hereby incorporated by reference in its entirety.

Thus, FIG. 3 depicts a measurement system to acquire a first set of measurements of the distances between nodes. In accordance with embodiments of the invention described herein, at least one additional measurement system is employed for purposes of acquiring measurements indicative of the same set of distances. This other system may be, in accordance with some embodiments of the invention, another optical system or an acoustical system. In this regard, in another measurement system, the optical devices 150A and 150B may be replaced by acoustic pingers, which each have a unique signature or code. Hydrophones, located at or near each seismic source element 104, detect and record the pinger signatures. The hydrophones may either be hydrophones detected to this purpose or may be near field hydrophones that are already present at each seismic source element 104 position.

Figure 4:
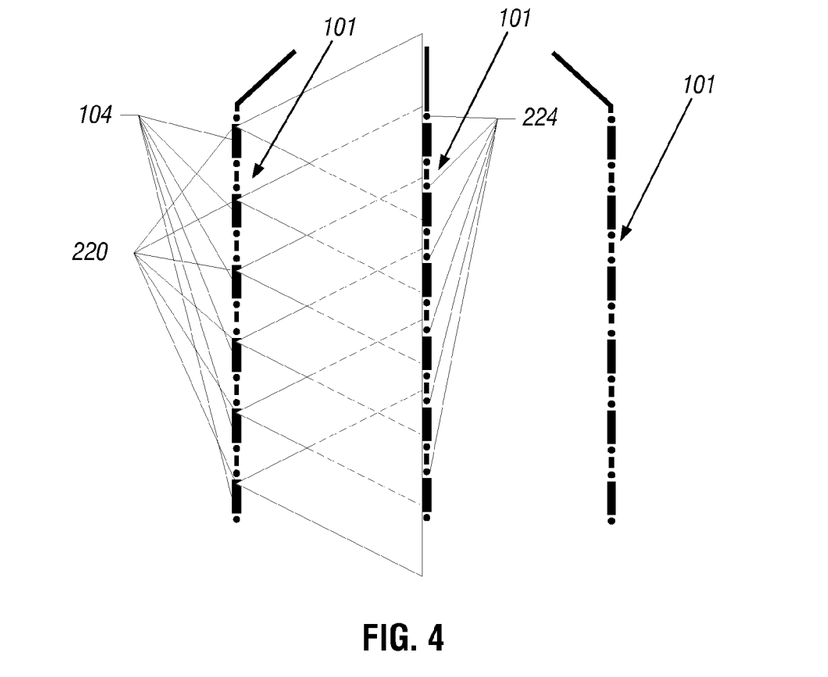

Alternatively, or in addition to the above-described systems, an arrangement that is depicted in FIG. 4 may be used for purposes of measuring distances between the nodes. In this regard, FIG. 4 depicts a measurement system in which light sources 220 and cameras 224 are included in each string 101. The cameras 224 record images based on light that is emitted from the light sources 220. Thus, the cameras 224 primarily record direct light, not reflected light. Each seismic source element 104 may be associated with a light source and a camera.

Figure 5:
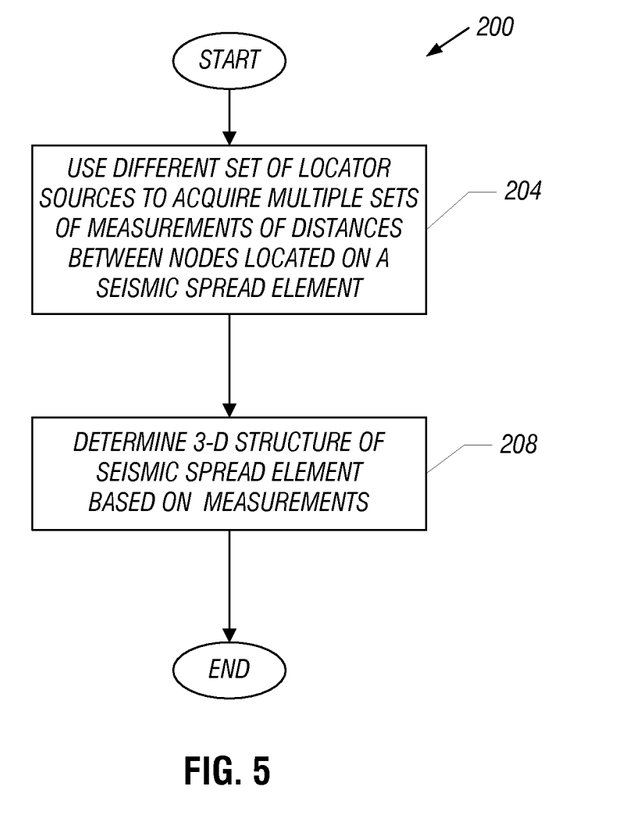
FIG. 5 is a flow diagram depicting a technique to determine the positions of seismic source elements according to an embodiment of the invention.

In general, a technique 200 that is depicted in FIG. 5 may be used for purposes of determining the positions of seismic source elements according to an embodiment of the invention. Pursuant to the technique 200, different sets of locator sources (acoustic sources or optical sources, as non-limiting examples) are used, pursuant to block 204, to acquire a multiple set(s) of measurements of distances between source and receiver nodes located on a seismic spread element. The 3-D node positions and thus, the 3-D positions of the seismic spread element may then be determined, pursuant to block 208, based on the measurements.

It is noted that the measurements that are obtained by the locator sources may be processed sequentially or simultaneously, depending on the particular embodiment of the invention. Furthermore, depending on the particular embodiment of the invention, the measurements may be acquired simultaneously, near simultaneously or at distinctly different times. Furthermore, it is noted that some of the measurements may be updated more or less frequently than others for purposes of determining the current three-dimensional structure. Thus, many variations are contemplated and are within the scope of the appended claims.

The determination of the 3-D structure may involve prior knowledge about the structure itself and possibly is characteristic in-sea movement. Such knowledge may be incorporated into the solution in several ways, including using it as an absolute constraint as a pseudo measurement in the observation equations or, for example, in a Bayesian framework.

Knowledge regarding the three-dimensional structure may be obtained, as examples, from the physical constraints imposed by the structure itself. For example, two nodes may be rigidly connected together and thus, always have the same distance between the nodes. As another example, a hydrodynamic model may be employed, which is used to project the structure based on a given sea state. The hydrodynamic model may, for example, use the latest determined three-dimensional structure and predict the next determined structure based on the sea state, towing conditions, etc.

Figure 6:
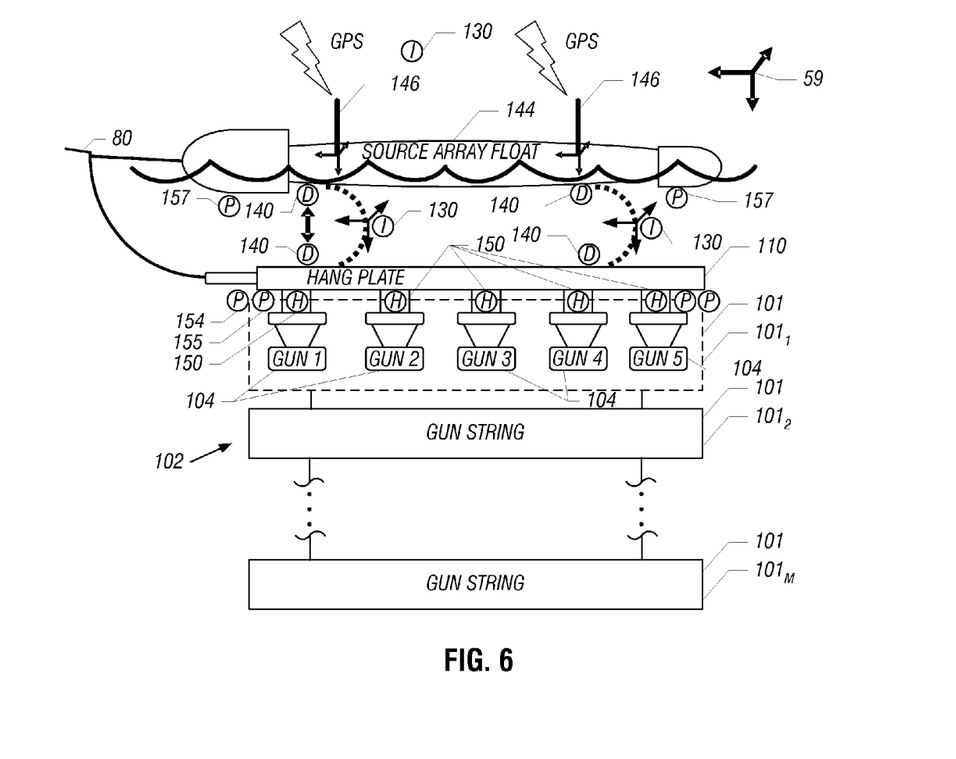
FIG. 6 is a schematic diagram of a string and float of a seismic source array according to an embodiment of the invention.

FIG. 6 depicts an example of a measurement system according to an embodiment of the invention. For this measurement system, the seismic source elements 104 (air guns, for example) are arranged in M strings 101 (strings $101_1$, $101_2 \ldots 101_M$ being specifically depicted as examples in FIG. 6), which may be air gun strings, for example. The strings 101 are part of an array 102 of strings 101, and the array 102 may include the depicted strings 101 as well as possibly strings 101 that are disposed beside the strings 101 that are depicted in FIG. 6. In this regard, the strings 101 that are depicted in FIG. 6 may be the center strings of a 3-D array 102 of strings 101, as a non-limiting example. Thus, the array 102 may have multiple levels of strings 101.

The top string $101_1$ is attached to a hang plate 110 that, in turn, is attached to a seismic source float 144 by non-rigid couplings, or hang chains 120. As depicted in FIG. 6, the strings 101 may hang from each other to establish different layers of the array 102, and thus, the array 102 is three-dimensional. However, it is noted that, in accordance with other embodiments of the invention, the array 102 may be two dimensional. For example, in accordance with some embodiments of the invention, only one string 101 may hang from the hang plate 110, and in other embodiments of the invention, multiple strings 101 may hang from the hang plate 110 at the same level. Thus, many variations are contemplated and are within the scope of the appended claims.

For the following example, acoustic pinger sources 154 and 155 of the string $101_1$ are described below. It is understood that the acoustic pinger sources 154 and 155 may be incorporated into and used in connection with the other strings 101 of the array 102, as further described below.

It is assumed for purposes of this example, that the strings 101 depicted in FIG. 6 are the center strings of the array 102. As depicted in FIG. 6, for the string $101_1$, two acoustic pinger sources 155 are located at either end of the string $101_1$ (as a non-limiting example) for purposes of emitting acoustic signals that propagate to and are detected by hydrophones 150 that are located with or are in close proximity to other seismic source elements 104 of the array 102. Thus, for each pinger source 155, hydrophones 150 on the string $101_1$ as well as the hydrophones 150 on the other strings 101 of the array 102 acquire a set of measurements indicative of distances between the nodes (i.e., the nodes includes a node associated with the pinger sources 155 and nodes associated with the hydrophones 150).

Figure 8:
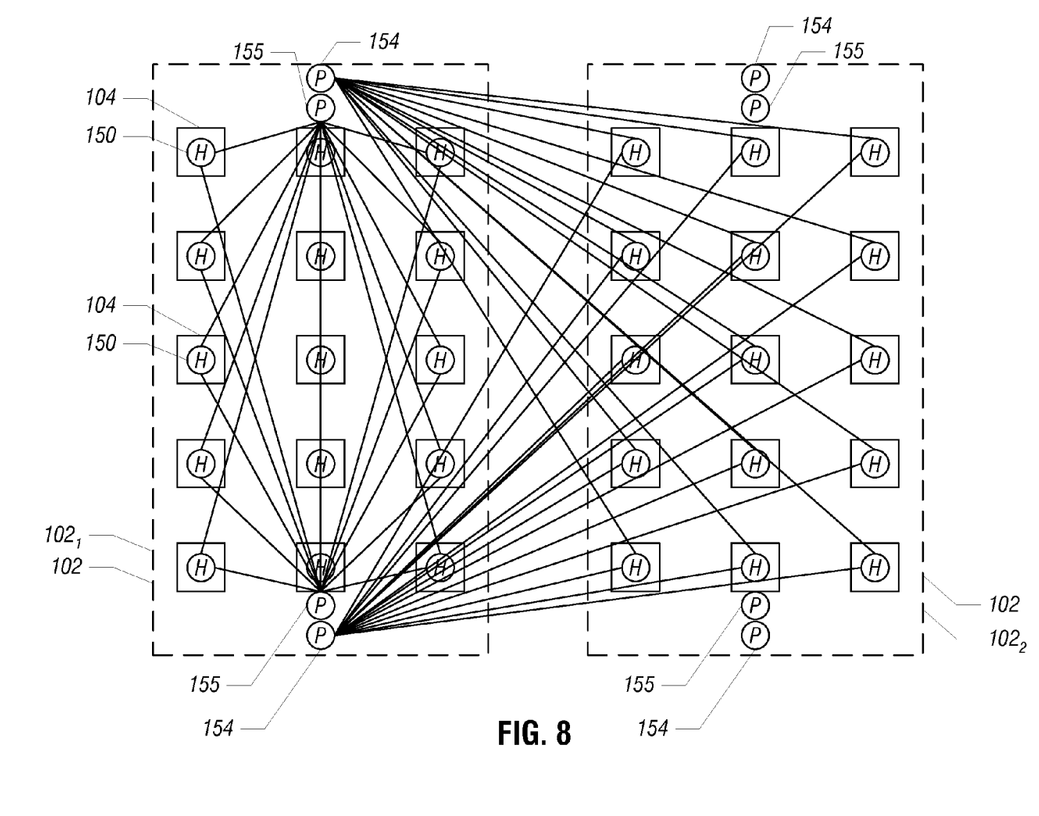
FIG. 8 is a schematic diagram illustrating the use of multiple acoustic locator sources to measure distances between nodes according to an embodiment of the invention.

In accordance with embodiments of the invention, the string $101_1$ may contain another set of pinger sources. For example, in accordance with some embodiments of the invention, two pinger sources 154 may be located at either end of the string $101_1$ (as a non-limiting example) for purposes of emitting acoustic signals that are detected by the hydrophones 150 of an adjacent array 102. More specifically, FIG. 8 depicts a top view of adjacent arrays $102_1$ and $102_2$ of an exemplary seismic source spread. Each array $102_1$, $102_2$ may have strings 101 that hang from each other at different depths, depending on the particular embodiment of the invention. In FIG. 8, the lines represent signal paths between the source and receiver nodes for the top level. For this example, the string $101_1$ of FIG. 6 may be considered to be the top string 101 of the center strings 101 of the array $102_1$. The adjacent array $102_2$ includes another set of pinger sources 154 that emit acoustic signals that are detected by the hydrophones 150 of the array $102_1$. Thus, the acoustic pinger sources 154 on the array $102_2$ emit signals that are recorded by the hydrophones 150 on the array $102_1$, and vice versa.

Thus, the pinger sources 154 and 155 transmit signals that are received by the hydrophones 150, which are located at or near multiple seismic source elements 104 that are located on different strings 101, which, in turn, have different three-dimensional positions. As a result, the activation of each pinger source 154, 155 produces a particular set of measurements of distances between nodes in the 3-D space that contains the strings 101. It is noted that additional strings 101 may contain the pinger sources 154 and 155 such that pinger sources 154 and 155 may be located in different levels of the array 102.

Figure 9:
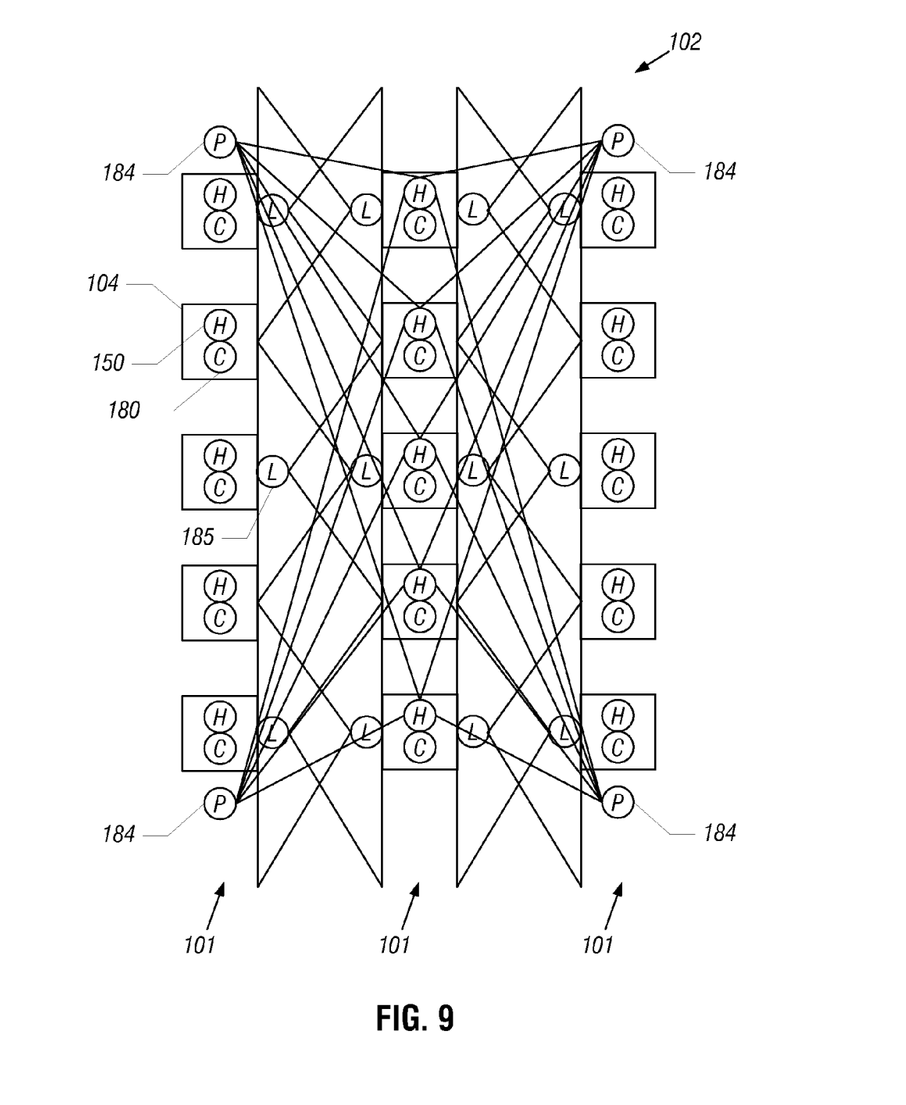
FIG. 9 is an illustration of the use of acoustic and optical sources to measure distances between nodes according to an embodiment of the invention.

As another variation, a combination of acoustic and optical sources may be used in accordance with embodiments of the invention of the invention. For example, referring to FIG. 9, in another arrangement, each seismic source element 104 may be co-located with a hydrophone element 150 and a camera 180. FIG. 9 depicts a top view of an array that includes a combination of the acoustic and optical sources in accordance with other embodiments of the invention. For this embodiment, the array 102, in general, includes three groups of strings 101, which each group possibly having multiple levels of strings 101 that hang from each other. The top string layer is discussed below, although it is understood that the strings 101 of the other vertical layers may have similar receivers and sources.

As shown in FIG. 9, acoustic pinger sources 184 are located on either end of the left and right strings 101. Furthermore, a light source 185 is provided at the end and middle seismic source elements 104 of each string 101. As shown, each light source 185 is directed toward another one of the strings 101.

Due to this arrangement, the acoustic pinger sources 184 emit acoustic signals that are received by the hydrophones 150 of the center string 101. Thus, two sets of measurements of the distances between the source node on the left string 101 and the receiver nodes on the center string 101 are acquired. Furthermore, two sets of measurements of the distances between the source node on the right string 101 and the receiver nodes on the center string are acquired.

In accordance with some embodiments of the invention, additional locator sources may be used for purposes of acquiring additional sets of measurements of the distance between nodes. For example, FIG. 6 depicts additional locator sources, such as acoustic pinger sources 157, which are located on the source float 144 for purposes of tying in the positions of the source float 144 to the string level. Thus, the acoustic pinger sources 157 may be activated, and hydrophones 150 on the strings 101 may record transmissions from the sources 157 for purposes of acquiring a set of measurements of distances between nodes of the source float 144 and nodes on the various strings 101.

Thus, as can be seen from the foregoing, multiple acoustic and/or optical locator sources, which may be located at different positions in a 3-D space, may be activated to transmit signals. Various acoustic and/or optical sensing devices, which are located near seismic source elements in the 3-D space acquire measurements of the distances between the source and receiver nodes. As described below, these measurements are used to determine the 3-D positions of the seismic source elements 104.

In accordance with embodiments of the invention, acoustic or optical adjustment points are positioned on a rigid body that is a part of the source array, such as the hang plate. This adds known distance to the observation mix. For example, if two acoustic points are separated by a known distance, this becomes a valuable calibration factor that can reveal propagation speed for the acoustic signal. This can also give relative orientation, both horizontal and vertical, to the bodies where the points are located. This is essentially a short baseline application.

In addition to measurements of distances between nodes that are located on the strings 102, auxiliary measurements of the positions of the nodes may be acquired. More specifically, referring back to FIG. 6, in accordance with some embodiments of the invention, GPS receivers 146 that are located on the source array float 144 provide auxiliary information pertaining to the tie-in of the float and the seismic source element level. Thus, the measurements acquired by the GPS receivers 146 provide the global initial conditions.

In accordance with some embodiments of the invention, the source array float 144 may be rigidly coupled to the hang plate 110, and as such, an inertial system may be used to determine the rotation of the hang plate 110 with respect to the float 144 so that the measurements may be rotated to the GPS earth centered, earth fixed reference frame. However, as depicted in FIG. 6, the hang plate 110 is coupled by non-rigid hang plate chains 130. Movement and rotation of the source array float 144 therefore does not reveal the relative motion of the hang plate 110. Thus, knowing the direction and distances between points on the source array float 144, as an example, will not provide the coordinates of the points on the hang plate 110.

To determine the relationship between nodes on the source array float 144 and nodes on the hang plate 110, a two axis orthogonally mounted inclinometer 130 may be coupled to each hang plate chain 120, in accordance with embodiments of the invention. The inclinometer 130 combined with a digital compass located on the hang plate or any other body that remains parallel with the hang plate through a rigid connection provides the crossline and inline angles between connection point of the chain and the connection point of the hang plate, and the heading of the source array float 144 and the hang plate 110. With knowledge of these two angles, the crossline and inline distances between the two bodies may be determined. In addition, knowledge of the vertical separation of the GPS antennae and the hang plate measured through pressure sensors 140 separated along the inline direction of the plate is available. This is essentially the rotation of the hang plate around the crossline axis relative to the sea surface. Thus, the three offsets in the float body reference frame, crossline and inline shift and vertical separation as well as rotation around the vertical axis (heading) and crossline axis (pitch) are determined and can be rotated into GPS reference frame giving the global position of the hang plate.

If an inclinometer is also attached parallel to the hang plate, the inclination of the hang plate around the crossline axis (pitch) of the hang plate can be overdetermined by adding information to the pressure sensors 140. In a like manner, attaching another inclinometer orthogonal to the inline axis of the hang plate gives rotation around the inline and crossline axes.

The techniques described herein permit in-situ calibration of the depth sensors, 140. The largest difference in pressure measured by the pressure sensor occurs when the chain between the float body and the hang plate is vertical relative to the sea surface. Since the chain length is known, this is a calibration factor giving an accurate conversion from pressure to meters in real time. This value can be used to determine water density for acoustic propagation models as well.

The distance between the GPS antenna phase center and the lower pressure sensor is another calibration opportunity. Since the largest separation between these two is the point in time when they are at maximum vertical offset relative to the sea surface, this is when the GPS antenna is vertical with respect to the sea surface. This information can be used to monitor the how much rotation out of the vertical the GPS antenna experiences as well as adding to the calibration of water density by giving a separate measurement from the one described in 0054.

These data combined with GPS antennae data give various levels of information. For example, two antennae along the inline axis of the surface float give heading and height above the reference sea surface.

Figure 7:
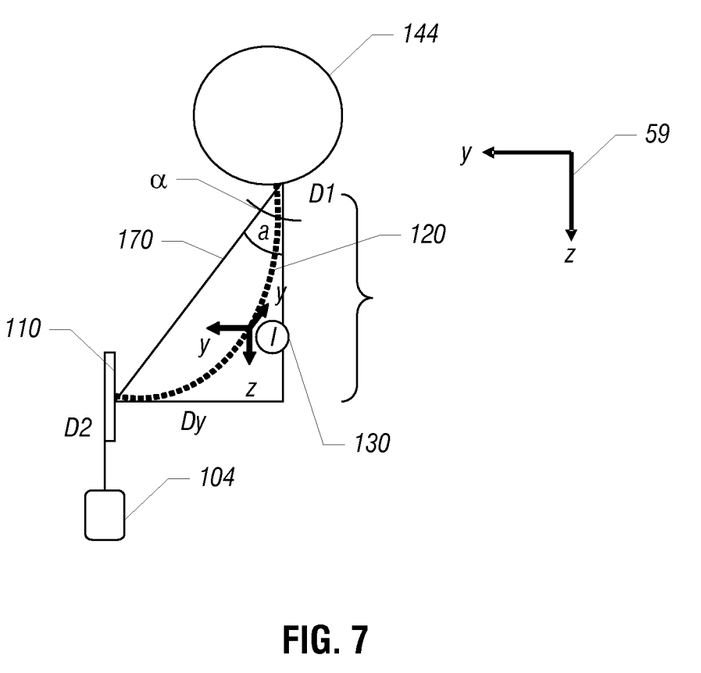
FIG. 7 is an illustration of the geometry between the float and the string of FIG. 6 according to an embodiment of the invention.

As a more specific example, FIG. 7 depicts a geometric relationship between the source string float 144 and the hang plate 110 in accordance with some embodiments of the invention. For purposes of determining the crossline distance between a node on the source string float 144 and a node on the hang plate 110, the geometric relationship between these nodes may be characterized by a triangle 170. The inclinometer 130 on the hang plate chain 120 measures the crossline angle, which is called "a" in FIG. 7. The crossline distance, called "Dy" may be determined as follows:

$$Dy = (D_1 - D_2) \cdot \tan^{-1}(\alpha),\qquad \text{Eq. 1}$$

where "$D_1$" represents the depth of the node on the source string float 144 and "$D_2$" represents the depth of the node on the hang plate 110.

In accordance with embodiments of the invention, the inclinometer 130 can be located at the midpoint of the hang plate chain 120 to provide the tangent along the curve, which is most parallel to the true inclination. It is noted that the midpoint location of the inclinometer 130 provides for the worst case scenario in which the hang plate chain 120 is non-straight. Depending on the source configuration, the hang plate chain 120 may be substantially straight, thereby allowing the inclinometer 130 to be placed at a point along the hang plate chain 130, other than its midpoint. Further, more than one inclinometer can be located along the hang plate chain to give a better measurement of the chain shape and overall tilt.

The inline distance between the node on the source string float 144 and the node on the hang plate 110 may be determined in a like manner. Additionally, the depths between the source string float 144 and the hang plate 110 may be determined, for example, by depth sensors 140 located on the source array float 144 and the hang plate 110, as depicted in FIG. 6.

It is noted that the above-described techniques and systems may be used in a similar manner to determine the absolute positions of all of the strings 101 of the array 102. In other words, inclinometers may be attached to all of the non-rigid couplings that link the strings 101 together, and thus, the GPS measurements may then be translated to other nodes in a similar manner.

The measurements that are made by the inclinometer 130 may be made at a frequency that reveals motion caused by wave motion. The hang plate displacement caused by the waves that propagate perpendicular in the direction of the tow is especially pronounced and variable since there is less restoring force in this direction. With measurements at this critical frequency, the inclinometer measurement noise may be reduced by fitting the measurements to a motion model that is derived by ocean waves.

The spatial frequency of the inclinometers determines the number of points on the two bodies that the relation will be known for. The need for this depends on the physical makeup of the bodies. In other words, the less rigid to the bodies, the more points that are needed to be determined to characterize the two shapes. The accuracy of the spatial relationship between the points on the source string float 144 and the hang plate 110 are governed by the noise and sampling frequency of the inclinometers and the depth sensors and the accuracy of the assumptions regarding the fixed relations between the two bodies. The relative positioning method also applies to any number of layers of strings 101.

The techniques described may be further enhanced by integrating the measurements with a physical model of motion.

The true 3-D positions of the nodes, and thus, ultimately, the true 3-D positions of the seismic source elements 104, may be determined from the above-described distance measurements as follows. The relationship between the acquired measurements, called "ŷ," and the state of the system may be described via a general functional relationship as follows:

$$\hat{y} = f(x,c) + \epsilon.\qquad \text{Eq. 2}$$

In Eq. 2, "x" represents the vector of coordinates, which specify the positions of nodes involved in the measurement (i.e., Eq. 2 is solved for "x"); "c" represents the vector of calibration parameters and other auxiliary measurements; "f" represents the mapping between the state space (x,c) and the measurements ŷ; and "ϵ" represents the vector of stochastic error terms. The stochastic error term $\epsilon$ may be modeled as a mean centered Gaussian distribution with a diagonal covariance matrix. However, other models for the error term $\epsilon$ may be used, as described further below.

Eq. 2 may be inverted with regard to the state space vector (x,c) for purposes of determining the node positions x. It is noted that there is no distinguishing between measurements obtained from the different measurement systems; and thus, the inversion of Eq. 2 is done simultaneously for all of the parameters in (x,c).

As a more specific example, application of Eq. 2 and the derivation of the node positions is set forth below for the case of acoustic measurements. For the acoustic data, each of the true distances, called "$y_{ij}$," between a source i and a receiver j may be described as follows:

$$y_{ij} = f(x_i, y_i, z_i, x_j, y_j, z_j) + \epsilon = \sqrt{(x_i - x_j)^2 + (y_i - y_j)^2 + (z_i - z_j)^2} + \epsilon. \quad \text{Eq. 3}$$

For this example, a Cartesian coordinate system has been used, and the calibration parameters have been disregarded for simplifying this discussion. However, it is noted that the calibration parameters may be considered in accordance with embodiments of the invention.

Eq. 3 sets forth a parameter estimation problem where the best fit of the state space vector (x,c) is determined based on the mapping f, the observed ranges $\hat{y}$ and an error model for the stochastic error $\epsilon$. In accordance with embodiments of the invention, the solution to Eq. 3 may be found by minimizing a cost function, called "g", which reflects the closeness of the fit as a function of the residuals, as described below:

$$(\bar{x}, \bar{c}) = \min_{x,c} g(\hat{y} - f(x, c)), \quad \text{Eq. 4}$$

The system set forth herein is an over-determined system, that may be solved by minimizing a least squares (LS) cost function, as described below:

$$(\bar{x}, \bar{c}) = \min_{x,c} \frac{1}{2} \|w(x, c)(\hat{y} - f(x, c))\|_2^2. \quad \text{Eq. 5}$$

In Eq. 5, "$\bar{x}$" represents the least squares estimate, and "w(x,c)" represents a weight function that adjusts the relative contributions of different measurements according to their joint precision. "$\|\cdot\|_2$" represents the L2 norm.

When the minimization problem that is set forth in Eq. 5 is solved, the weight function w(x,c) takes the form of a positive definite matrix. Furthermore, for the purposes of giving the least squares estimate a useful statistical interpretation, and obtain a solution that is (asymptotically) optimal in a statistical sensor, the weight matrix is often taken to be the inverse of an estimate of the covariance matrix (also called the dispersion matrix). Eq. 5 is nonlinear and generally solved by a second order Newton method.

The solution of the least squares problems with the weight matrix w(x,c) being equal to the dispersion matrix is equal to the maximum likelihood estimates of the unknown parameters when the error process is Gaussian. Maximum likelihood estimators have the following properties: they are best linear unbiased estimators (best in an asymptotic minimum variance sense); and their posterior distribution converge to a Gaussian distribution. Real processes are generally non-Gaussian, with the tails being much longer due to the presence of outliers. Most of the time, in network adjustments, outliers are handled by filtering the data, by using the median or n % trimmed mean instead of the mean or optimizing in L1 space instead of L2 space, or by use of posteriori outlier detection algorithms. However, the use of these techniques may be suboptimal because the environment in which the measurements are made may be inherently challenging so that a substantial number of outliers is to be expected. Furthermore, in the use of the above-described standard techniques, there may be a limitation to the amount of acoustic emitters in the system. Therefore, the redundancy level may be quite low, and outright elimination of observations may have a significant negative impact on the end result.

An inherent advantage of the maximum likelihood estimators is that the estimators are inherently robust with regard to outliers as long as the total (inlier+outliers) distribution is modeled to a reasonable degree. Note that while unmodelled outliers generally have a massive impact on the parameter estimates; using a conservative estimate (that is, using a model distribution with longer tails than the real total distribution) does not affect the accuracy to a significant degree.

In accordance with embodiments of the invention, another approach than the standard least squares approach is to attack the problem from a statistical viewpoint and incorporate the outliers into an error model. For example, the error model may be a Lorentz distribution, instead of a Gaussian distribution, or may be modeled as a Gaussian mixture model with a small-variance (inline) and a longer-tailed (outlier) part.

The benefits of this latter approach may include one or more of the following. More information is utilized as "bad" observations are down weighted instead of eliminated. The beneficial properties of the maximum likelihood estimators are preserved. Because of the asymptotic convergence to the normal distribution diagnostic techniques, such as error ellipses (as an example) that are often used by the customers still have a firm statistical foundation.

In general, the use of non-Gaussian error distributions will result in a cost function g that has a different form than the least squares cost function that is set forth in Eq. 5.

Figure 10:
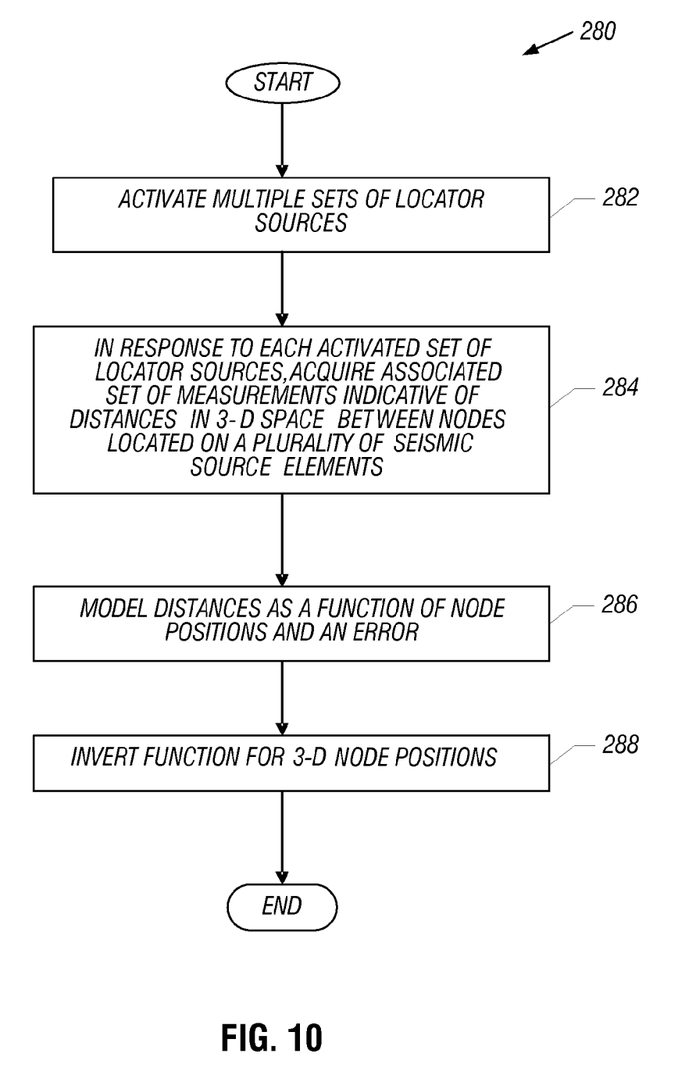
FIG. 10 is a flow diagram depicting a technique to determine the positions of seismic source elements using multiple locator sources according to an embodiment of the invention.

To summarize, FIG. 10 depicts a technique 280 in accordance with some embodiments of the invention. Pursuant to the technique 280, multiple sets of locator sources are activated (block 282). As examples, the locator sources may be optical and/or acoustical locator sources. The technique 280 includes acquiring (block 284) a set of measurements indicative of distances in 3-D space between nodes that are located a plurality of seismic source elements in response to each activated set of locator sources. The measured distances are modeled (block 286) as a function of node positions and an error, and the function is inverted, pursuant to block 288, for the 3-D node positions.

Referring to FIG. 11, in accordance with some embodiments of the invention, a processing system 320 may perform at least some of the techniques that are disclosed herein for such purposes of acquiring multiple sets of measurements of distances between nodes, and determining the positions of the nodes, based on the measurements. The system 320 may be located on a surface acquisition system, on a streamer, on the towed seismic source, on the surface vessel 20 (FIG. 1) at a remote location, etc. In accordance with some embodiments of the invention, the system 320 may include a processor 350, such as one or more microprocessors and/or microcontrollers.

The processor 350 may be coupled to a communication interface 360 for purposes of receiving data that corresponds to the acquired distance measurements.

As examples, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the system 320 and may store, for example, various input and/or output data sets involved with the techniques 200 and/or 280, as indicated by reference numeral 348. The memory 340 may store program instructions 344, which when executed by the processor 350, may cause the processor 350 to perform one or more of the techniques that are disclosed herein, such as the techniques 200 and/or 280 and display results (such as the 3-D node positions, for example) obtained via the technique(s) on a display (not shown in FIG. 11) of the system 320, in accordance with some embodiments of the invention.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
obtaining a first set of measurements of distances between nodes located on a seismic spread element while in tow using a first set of one or more sources;
obtaining a second set of measurements of the distances using a second set of one or more sources; and
determining a three-dimensional structure of the seismic spread element while in tow based at least in part on selectively weighted contributions of the first and second sets of measurements, the determining comprising modeling the first and second sets of measurements of distances as an over-determined system.

2. The method of claim 1, wherein seismic spread element comprises a seismic source, seismic streamer or tailbuoy.

3. The method of claim 1, wherein the sources comprise acoustic sources.

4. The method of claim 1, wherein the sources comprise optical and acoustic sources.

5. The method of claim 1, wherein the sources comprise inclinometers.

6. The method of claim 1, wherein the determining is further based on prior knowledge of the structure.

7. The method of claim 6, wherein the knowledge comprises fixed dimensions between points of the seismic spread element.

8. The method of claim 1, wherein the act of determining comprises: further basing the determination of the three-dimensional structure on a previous determination of the three-dimensional structure.

9. The method of claim 1, wherein the determining comprises:
modeling the measurements collectively as a function of positions of the nodes and an error; and
inverting the function for the positions of the nodes.

10. The method of claim 1, wherein the act of determining comprises determining inline, crossline and depth positions of the three-dimensional structure.

11. The method of claim 1, wherein the determining further comprises minimizing a least squares cost function to solve the over-determined system.

12. The method of claim 1, wherein determining the three-dimensional structure of the seismic spread element further comprises assigning the weights of the first and second sets of measurements to the determined three-dimensional structure based at least in part on a joint precision of the first and second sets of measurements.

13. The method of claim 12, wherein assigning the weights further comprises assigning the weights based at least in part on an estimate of a covariance matrix.

14. The method of claim 12, wherein assigning the weights further comprises assigning the weights based at least in part on an estimated inverse of a covariance matrix.

* * * * *